UNITED STATES PATENT OFFICE.

SOLOMON GANELIN, OF PHILADELPHIA, PENNSYLVANIA.

METHOD OF TREATING SULFID ORES.

SPECIFICATION forming part of Letters Patent No. 593,416, dated November 9, 1897.

Original application filed May 7, 1897, Serial No. 635,585. Divided and this application filed October 5, 1897. Serial No. 654,158. (No specimens.)

*To all whom it may concern:*

Be it known that I, SOLOMON GANELIN, a subject of the Czar of Russia, residing at the city of Philadelphia, in the county of Philadelphia and State of Pennsylvania, have invented a Method of Treating Sulfid Ores in which Silver is Present, of which the following is a specification.

My invention is based on the following reaction, of which I believe myself to be the discoverer. Silver sulfid if brought into contact with or stirred into a mass or bath of molten or fused halogen salt of most of the metals gives rise to a double decomposition. The silver combines with the halogen radical of the fused or molten bath or mass and the metal of the latter combines with the sulfur of the silver sulfid according to the following equation:

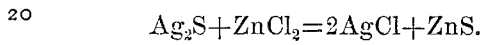

$$Ag_2S + ZnCl_2 = 2AgCl + ZnS.$$

The object of my invention is to provide a practical and efficient method of treating ores containing silver sulfid and recovering the silver.

In the practice of my invention ground ore is stirred into a bath or mass of fused or molten metal chlorid, as zinc chlorid. The reaction commences immediately and double decomposition takes place between the silver sulfid present in the ore and the fused zinc chlorid and results in the formation of zinc sulfid or blende and silver chlorid, both in quantities substantially equivalent to the quantity of silver sulfid in the ore. Except silver and lead sulfids the other sulfids of the ore remain as such in the fused or molten bath.

In my application, Serial No. 635,585, of which this is a division, I have claimed the described treatment of the ore for the recovery of lead. Hence I do not claim the same herein, but I desire it to be understood that in practice the ore may be treated for the recovery of either or both of these products in the manner described in this and in said application.

Silver may be recovered from the silver chlorid contained in the fused bath or mass by means of a metal more basic than silver—as zinc, lead, and the like. Such basic metal may be introduced directly into the molten or fused bath. An excess of this basic metal is usually employed in order to form an alloy of silver of which the melting-point is lower than that of silver, so that the alloy will melt and collect at the bottom and may be drawn off therefrom. The mass or bath, assumed to be of zinc chlorid and now containing the ore from which the silver has been recovered, may be removed from the vessel and permitted to cool, whereupon it may be systematically leached with water to separate the zinc chlorid from the ore. The solution of zinc chlorid thus obtained may be concentrated and evaporated to dryness and again used for making a fused bath into which ground ore may be introduced. If preferred, the described bath containing the silver chlorid may be first cooled and leached, so that the silver chlorid will go into solution along with the zinc chlorid. The latter has the known property of causing comparatively large quantities of silver chlorid to go into solution. From this solution the silver may be recovered by any known or preferred method.

Having thus described the nature and objects of my invention, what I claim as new, and desire to secure by Letters Patent, is—

1. The method of treating sulfid ores in which silver sulfid is present which consists in preparing a mass or bath of a fused halogen salt capable of being decomposed by said sulfid and introducing said ore into said fused bath or mass and thereby effecting double decomposition between the silver sulfid of the ore and the salt of the bath, whereby conversion is effected of the silver sulfid into silver chlorid and of the base of the halogen salt of the bath into a sulfid, substantially as described.

2. The method of treating ores in which silver sulfid is present which consists in introducing the ore into a fused mass or bath containing zinc chlorid, and thereby converting the silver sulfid into silver chlorid and forming sulfid of zinc, and then reducing the formed silver chlorid to the metallic state by the introduction of a metal more basic than silver into the fused bath or mass, substantially as described.

In testimony whereof I have hereunto signed my name.

SOLOMON GANELIN.

In presence of—
 A. B. STOUGHTON,
 W. J. JACKSON.